(12) United States Patent
Chien et al.

(10) Patent No.: US 7,882,111 B2
(45) Date of Patent: Feb. 1, 2011

(54) USER INTERACTIVE PRECISION TARGETING PRINCIPLE

(75) Inventors: Shu-Yao Chien, Sunnyvale, CA (US);
Amitabh Seth, Saratoga, CA (US);
Nikolai Rochnik, San Mateo, CA (US);
George H. John, Redwood City, CA (US)

(73) Assignee: Yahoo! Inc., Sunnyvale, CA (US)

( * ) Notice: Subject to any disclaimer, the term of this patent is extended or adjusted under 35 U.S.C. 154(b) by 315 days.

(21) Appl. No.: 11/757,296

(22) Filed: Jun. 1, 2007

(65) Prior Publication Data

US 2008/0301118 A1   Dec. 4, 2008

(51) Int. Cl.
    *G06F 17/00* (2006.01)
(52) U.S. Cl. .................. 707/749; 707/750
(58) Field of Classification Search .......... 707/5, 707/2, 4, 728, 748, 749, 750, 751, 758; 705/27
See application file for complete search history.

(56) References Cited

U.S. PATENT DOCUMENTS 6,826,724 B1 * 11/2004 Shimada et al. ............. 715/234

| | | | | |
|---|---|---|---|---|
| 2005/0043060 A1 * | 2/2005 | Brandenberg et al. | ....... | 455/558 |
| 2005/0216516 A1 * | 9/2005 | Calistri-Yeh et al. | ..... | 707/104.1 |
| 2005/0240580 A1 * | 10/2005 | Zamir et al. | .................. | 707/4 |
| 2006/0173556 A1 * | 8/2006 | Rosenberg | ..................... | 700/3 |
| 2008/0033840 A1 * | 2/2008 | Upendran et al. | ............. | 705/27 |

OTHER PUBLICATIONS

Author: Brian et al.; Title: Optimizing Similarity Using Multi Query Relevance Feedback; Date: Copyright 1986; pp. 58.*

* cited by examiner

*Primary Examiner*—Tony Mahmoudi
*Assistant Examiner*—Md. I Uddin
(74) *Attorney, Agent, or Firm*—Stattler-Suh PC (57) ABSTRACT

A method of determining content relevance for a user sets a user preference, which is related to a first area of content. The method calculates a set of scores, by using a combination, of the user preference, affinity data, and a parametric weight. The method organizes the content by using the set of scores, such that the organization of the content has a desirable relationship to the user, and recommends the selected content. Preferably, the method precomputes the affinity data and/or the parametric weight to generate and store the precompiled data for later retrieval. The affinity data describes a relationship between a first item of content and a second item of content, and the parametric weight describes an attribute of the second item. Additional embodiments include a system implementation and computer readable medium.

24 Claims, 5 Drawing Sheets

```
More                    Less
Similar                 Similar
0  1  2  3  4  5  6  7  8  9
      ----+---------------------
          302
```

*Figure 3*

```
Less                    More
Distant                 Distant
0  1  2  3  4  5  6  7  8  9
--------+------------------
        402
```

*Figure 4*

|           |             |       |        | Parameter Weights |          |
|-----------|-------------|-------|--------|------------|----------|
| Pred Item | Target Item | Affi Score | Pop Weight | Distance Weight |  |
| NBA       | ABA         | 0.95  | 0.20   | 0.11       |          |
|           | NCAA        | 0.74  | 0.80   | 0.11       |          |
|           | Basketball  |       |        |            |          |
|           | B-Card      | 0.67  | 0.40   | 0.99       |          |

USER INTERACTIVE PRECISION TARGETING PRINCIPLE

FIELD OF THE INVENTION

The present invention is directed towards the field of providing online content, and more particularly toward user interactive precision targeting principle.

BACKGROUND OF THE INVENTION

Online networks, such as the Internet, connect a multitude of different users to an abundance of content. Just as the users are varied, the content is similarly varied in nature and type. In particular, the Internet provides a mechanism for merchants to offer a vast amount of products and services to consumers. Internet portals provide users an entrance and guide into the vast resources of the Internet. Typically, an Internet portal provides a range of search, email, news, shopping, chat, maps, finance, entertainment, and other Internet services and content, Yahoo, the assignee of the present invention, is an example of such an Internet portal.

When a user visits certain locations on the Internet (e.g., web sites), including an Internet portal, the user enters information in the form of online activity. This information may be recorded and analyzed to determine behavioral patterns and interests of the user. In turn, these behavioral patterns and interests may be used to target the user to provide a more meaningful and rich experience on the Internet, such as an Internet portal site. For example, if interests in certain products and services of the user are determined, advertisements and other content, pertaining to those products and services, may be served to the user. A behavior targeting system that serves highly appropriate content benefits both the content provider, who provides their message to a target audience, and a user that receives content in areas of interest to the user.

Currently, providing content through computer networks such as the Internet is widespread along with content through other mediums, such as television, radio, or print. Different online content has different objectives and appeal depending on the user toward whom the content is targeted. The value to the user of media or a particular medium will largely be based on the quality of the content provided to the user. Quality has a number of factors, including the relevance to a specific user at a specific moment in time, for instance. Hence, considering the vast amount of information available to the broad spectrum of disparate users, the delivery of quality content at any given time is not a trivial task.

SUMMARY OF THE INVENTION

Some embodiments operate by using a user interactive precision targeting principle, in which users dynamically adjust content and/or item relevance parameters based on real time needs. Advantageously, item relevance is automatically adjusted based on the users' input parameters. Moreover, the users' parameter adjusting behavior is stored and utilized to enhance user experience and improve targeting effectiveness.

More specifically, a method of determining content relevance for a user sets a user preference, which is related to a first area of content. The method calculates a set of scores, by using a combination of the user preference, affinity data, and one or more parametric weights. The method organizes the content by using the set of scores, such that the organization of the content has a desirable relationship to the user, and recommends selected content. Preferably, the method precomputes the affinity data and/or the parametric weight to generate and store the precompiled data for later retrieval. The affinity data describes a relationship between a first item of content and a second item of content, and the parametric weight describes an attribute of the second item.

In a particular embodiment, the parametric weight includes a metric for the popularity and/or similarity of an item of content. In some of these embodiments, the content is organized by using a tree structure, and the parametric weight is based on a tree distance. In one implementation, the user preference is received directly from the input of a user through an interactive user interface. These implementations preferably store the user preference, and retrieve the user preference, as needed. Alternatively, the user preference is set by using information retrieved from at least one of the following: (1) an area of content for a particular user, as in the case where the user sets the user preference, or (2) from a set of demographically similar users. The second implementation has advantages when the user has little accumulated data. In these cases, the preference setting optionally occurs without the need for user action.

Preferably, the calculated set of scores includes relevance scores. Some embodiments store the calculated set of scores, and retrieve the calculated set of scores, as needed to customize for the particular user, a relevance metric for each of several items of content. These embodiments advantageously select content by using the calculated set of scores, and optionally present the recommended content, which is personalized to the user. The recommending or presentation often involves a push technology. Particular implementations update the user preferences, the affinity date, the parametric weight, and/or the set of scores, as part of an automated process. Further, the updating is periodic, real time, or some combination of both.

Additional embodiments include a computer readable medium storing a computer program, and a system for determining relevance of content. The system has a user interface, a relevance engine, and a profile manager. The user interface is for receiving a user preference. The relevance engine involves a parametric model for calculating a set of scores based on the user preference, affinity data, and/or one or more parametric weights. The profile manager is for organizing the user preference and/or the calculated set of scores. The profile manager typically includes data storage for record keeping and/or retrieval of the user preference and the calculated set of scores, as needed by the system. The calculated and/or inputted user data are optionally organized into user profiles, which are further advantageously mined for information, such as profile similarities and groups.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

Within the field of content recommendation, user interaction with the system is an effective real-time factor for enhancing recommendation relevance. Hence, some embodiments exploit user interactions to generate user-based customized results by using three components: (1) an interactive user interface, (2) a relevance engine, and (3) a user preference and/or profile manager. The interactive user interface allows one or more users to input preferences for specific content, or across a variety of content. The relevance engine operates by using a parameterized model that takes individual user preference parameters and dynamically adjusts relevance logic to generate accurate recommendations that are germane and/or appropriate to each user, at particular times and/or levels of user interaction. The user preference manager advantageously includes a data store that retains a user's preference parameters and more advanced patterns regarding the user's preferences, interactions, and/or system activities.

I. User Interface and Interaction for Expressing Preferences

Obtaining input in terms of a real-time contextual user preference is first-hand information in understanding and even anticipating a user's intentions. Item relevance is context-sensitive upon a user's needs. For instance, at a broad category level, a particular user is often interested in content related to sports on weekends, but is more interested in the stock market during the week, and then prefers online poker in the evenings. For this single user, or across a demographic of users, delivering the most appropriate content or recommendations for content advantageously results in greater click-through rates, more sales and leads opportunities, and an overall better user experience. Accordingly, particular embodiments of the invention include several components that operate to identify and deliver higher quality and more timely content and/or recommendations. As mentioned above, one such component is an interactive user interface for a user to input preferences.

Figure 1:
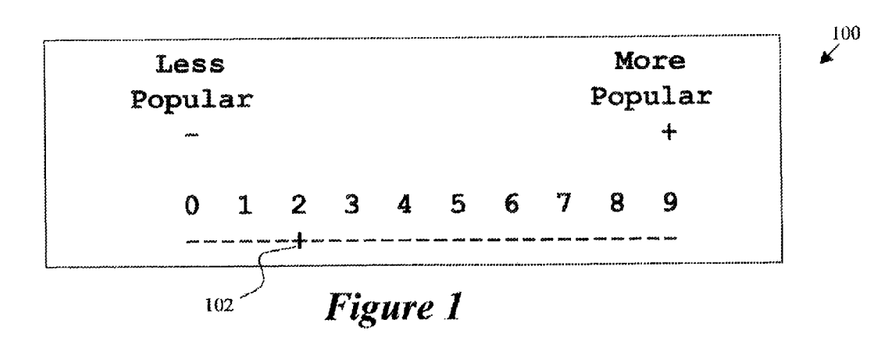
FIG. 1 conceptually illustrates an interactive user interface.

FIG. 1 illustrates a user interface 100 of some embodiments. Preferably, the user interface 100 is interactive and allows the user to input a particular preference, by using a selector 102 along a spectrum or gradient of preferences. The exemplary interface 100 is simplified. However, one of ordinary skill recognizes alternative implementations such as, for example, sliding scales, rotating knobs, level meters, and the like. As shown in FIG. 1, one preference relates to popularity. For instance, a user who is interested in seeing the most popular content available advantageously directs the selector 102 toward the more popular region of the user interface 100.

One usage of the "popularity" user preference is for users to select or browse between recommendations for content items in the (less popular) tails of a popularity distribution, and the more popular items of the distribution. Another use of a popularity preference is for cold start or new users for whom the recommendation system has not built up a profile that is broad enough to make relevant recommendations. In this situation, a user, or alternatively, the system in an automated process, moves the selector toward the higher popularity side to receive relevant items in an increasing filter fashion. What is more popular varies by content. Hence, different metrics apply to measure each type of content. For instance, news popularity of RSS feeds is measured in numbers of reads, while groups or forum popularity is measured by number of members or users. Content categories are a useful means of discussing content. Hence, content in the form of categories is described in several illustrative examples herein. However, one of ordinary skill recognizes a variety of forms and structures for content.

Available content is typically diverse and/or voluminous in nature. Hence, as mentioned above, it is often advantageous to organize available content into a set of manageable categories. For instance, Table 1 illustrates an exemplary organization for content available through a network of networks, such as the Internet.

TABLE 1

| Sample Categories. |
|---|
| # |
| 360° |
| A |
| Account Information |
| Address Book |
| Alerts |
| Answers |
| Anti Spyware |
| Anti-Virus |
| Ask Yahoo! |
| AT&T Yahoo! Dial |
| AT&T Yahoo! High Speed Internet |
| Auctions |
| Autos |
| Avatars |
| B |
| Babel Fish Translations |
| Banking Center |
| Bargains |
| Baseball - MLB |
| Bill Pay |
| Bookmarks |
| Briefcase |
| Business |
| Buzz Index |
| C |
| Calendar |
| Cars |
| Chat |
| Classifieds |
| Courses & Degrees |
| D |
| Dating |
| Del.icio.us |
| Developer Network |
| Dictionary |
| Directory |
| Directory Submit |
| Domains |
| Downloads |
| Driving Directions |
| DSL |
| E |
| Education |
| Elections |
| Encyclopedia |
| Entertainment |

TABLE 1-continued

Sample Categories.

F

Family Accounts
Fantasy Sports
FIFA World Cup
Finance
Firewall
Flickr

G

Games
GeoCities
Golf
Greetings
Groups

H

Health
Help
Horoscopes
HotJobs

I

Insurance
International
Internet Access

J

Jobs

K

Kids

L

Loans
Local
Lottery

M

Mail
Maps
Member Directory
Merchant Solutions
Message Boards
Messenger
Mobile
Mobile Games
Mobile Wallpaper
Movies
Music
Mutual Funds
My Yahoo!

N

NASCAR
NBA
NCAA Basketball
NCAA Football
News
NFL
NHL
Norton Internet Security
Notepad

P

Parental Controls
People Search
Personals
Pets
Photos
Picks
Podcasts
Points
Pop-Up Blocker
Premium Services
Publisher Network TABLE 1-continued Sample Categories.

R

Radio
Real Estate
Reference
Ringtones

S

Search
Search Marketing
Security Center
Shopping
Small Business
Soccer
Sponsor Listings
Sports
Spyware Removal
Stock Quotes

T

Taxes
Tech
Tennis
The Spark
Tickets
Tones
Toolbar
Travel
TV

U

Upcoming.org

V

Verizon Yahoo! for
DSL
Video
Video Games
Voice

W

Wallet
Weather
Web Hosting
Widgets

Y

Yahoo! by Phone
Yahoo! Next
Yahoo! Phone Card
Yahooligans!
Yellow Pages

Figure 2:
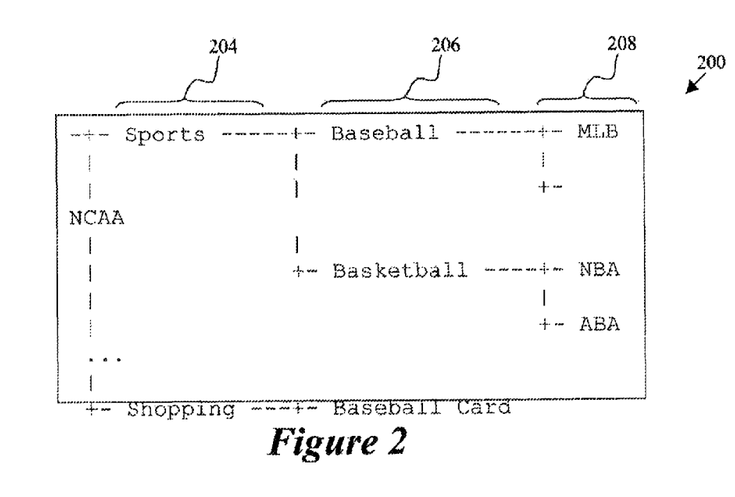
FIG. 2 illustrates an example of a tree structure for representing content.

As recognized by one of ordinary skill, each category in Table 1 further contains copious amounts of content and subcontent. Preferably, such categories, content and/or subcontent are organized into a searchable and/or navigable structure such as a tree. FIG. 2 illustrates an exemplary tree structure 200 for some of the categories and related content illustrated in Table 1. The illustrative tree 200 of FIG. 2, preferably includes several top level categories 202, and a number of sublevels 203 and 204, for additional and/or detailed content organized within each top level category 202. More specifically, FIG. 2 illustrates two categories Sports and Shopping, each having related content and/or subcontent. The Sports category includes, for example, Baseball, and Basketball, which each have subcontent, such as, for example, major league baseball (MLB) and college baseball (NCAA) for baseball, while basketball has national league (NBA) and American league (ABA). Separately from the Sports category, the Shopping category has such content as Baseball Cards, which relate to purchase, sale, trade, or other transactions for baseball cards. One of ordinary skill recognizes that the tree structure 200 is merely exemplary, and that each category in the tree 200, preferably spawns many branches and large amounts of associated content.

Figure 3:
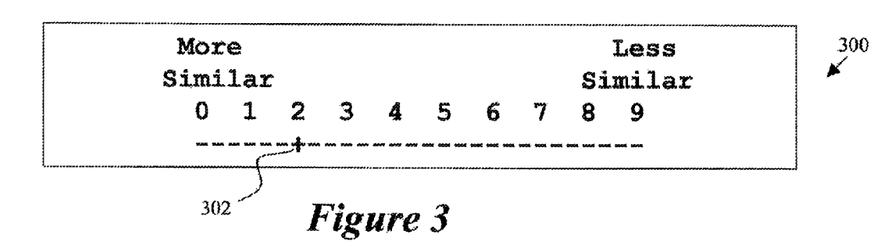
FIG. 3 illustrates an alternative user interface for similarity.
Figure 4:
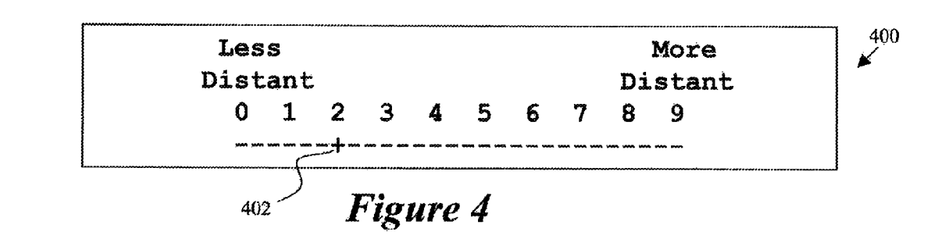
FIG. 4 illustrates an alternative user interface for distance.

Accordingly, users of the exemplary content of Table 1 and FIG. 2, typically have additional interest and/or preferences in such content, beyond merely popularity, for example. Hence some embodiments include additional user interlaces for receiving the preferences of these users. FIG. 3 illustrates a user interface 300 for another user selectable preference. As shown in this figure, the user advantageously directs another content preference, namely, item similarity, by using a selector 302. FIG. 4 illustrates an alternative interface 400 whereby a selector 402 indicates a preference for content relevance by using a different moniker, namely, distance in terms of content relationship.

The foregoing FIGS. 1 through 4 illustrate a variety of possible relationships between content in terms of the arbitrarily defined categories of Table 1, and between the content and the user. These relationships are optionally defined by selected item attributes or parameters. The item parameters are preferably defined by the content itself. These item parameters such as popularity, similarity or distance, and other parameters are preferably used in conjunction with the preferences of the user.

Preferably, the combined use of these item parameters with the user preference is calculated and stored only for the particular user expressing the preference as part of a user profile, for example. The parameters expressing the general relationship between content items is stored separately as part of a data base or storage tree of content items, such that the relationships between content items are useable for several users. Further, item parameters or attributes are updated, separately from the preferences of a single user. For instance, while a specific user has a preference for popular items, which is stored, each item has its own popularity, which is separately stored. Meanwhile, the user typically updates the user preference, and separately, the system updates the content attributes such as the item parameter for popularity, for instance.

The following illustrates the interaction between an item parameter and a user preference. Some embodiments define content similarities by a particular distance function, for instance, tree distance. In these embodiments, the user advantageously Indicates a preference for a range of tree distances, for a selected category, to customize the user's interaction with the content. This interaction is typically both automated, and manually specified at various times by the user.

For instance, one usage of the "category distance" user preference is when a user wishes to explore recommendation items that belong to different categories, if the user is more interested in items in similar categories, the user moves the category distance preference selector toward the less distant area of the interface to adjust the type of recommendation items, which the user receives. In the example illustrated by FIG. 2, NCAA Baseball is the top recommendation for a user profile that shows an interest in major league baseball (MLB), since these content categories and/or items are nearest each other in the example tree. If however, the user selects more distant (or less similar) content, for example, some embodiments include a relevance and/or recommendation engine that produces recommendations for a wider variety of items such as items related to the NBA, for instance. The relevance and/or recommendation engine of these embodiments is further described next.

II. Parameterized Relevance Model

Figure 5:
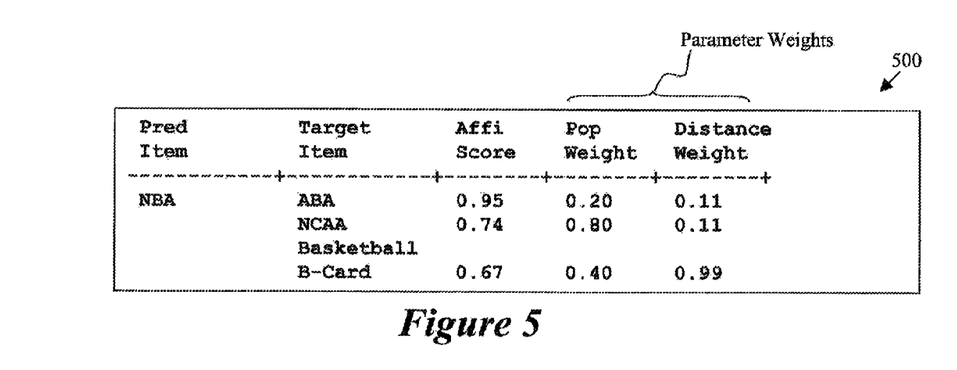
FIG. 5 illustrates a parametric model of some embodiments.

Advantageously, the item parameters discussed above are implemented as part of a relevance-based computation model. FIG. 5 is an illustration of such a model 500. As shown in this figure, the model 500 includes an exemplary predictor item (NBA) and several associated target items (ABA basketball, NCAA basketball, and baseball-cards abbreviated as b-card). For this example, the items of FIG. 5 correspond to the category tree items of FIG. 2.

Each of the target items has an associated Affinity-based Score, and/or one or more parameter weights, such as a popularity weight and a distance weight, which are shown in the exemplary illustration 500. Preferably, the affinity score and/or parametric weights are predetermined by using demographic data, and/or by using a set of properties for the predictor item and each target item. For instance, there is a strong relationship between the NBA and the ABA, as shown by the illustrative affinity score of 0.95. However, the minor league American Basketball Association (ABA) is generally not a popular content item, as shown by the example popularity weight of 0.20.

As another example, there is an affinity for users of NBA content, for baseball-card content, such as baseball card sales in the Shopping category. Embodiments of the invention advantageously include such affinities, though not always apparent, as part of demographic and other affinity data. For instance, there is often an affinity between beer and diaper consumers. Some embodiments pre-calculate the various affinity and parametric data and/or update such data on an ongoing periodic and/or real time basis. Once the model 500 is populated with various affinity and or parametric weight data, some embodiments advantageously combine user preference data into the model to yield a variety of useful content relevance information for a particular user, and based on the particular user's preferences. Such an embodiment is described by reference to FIG. 6.

Figure 6:
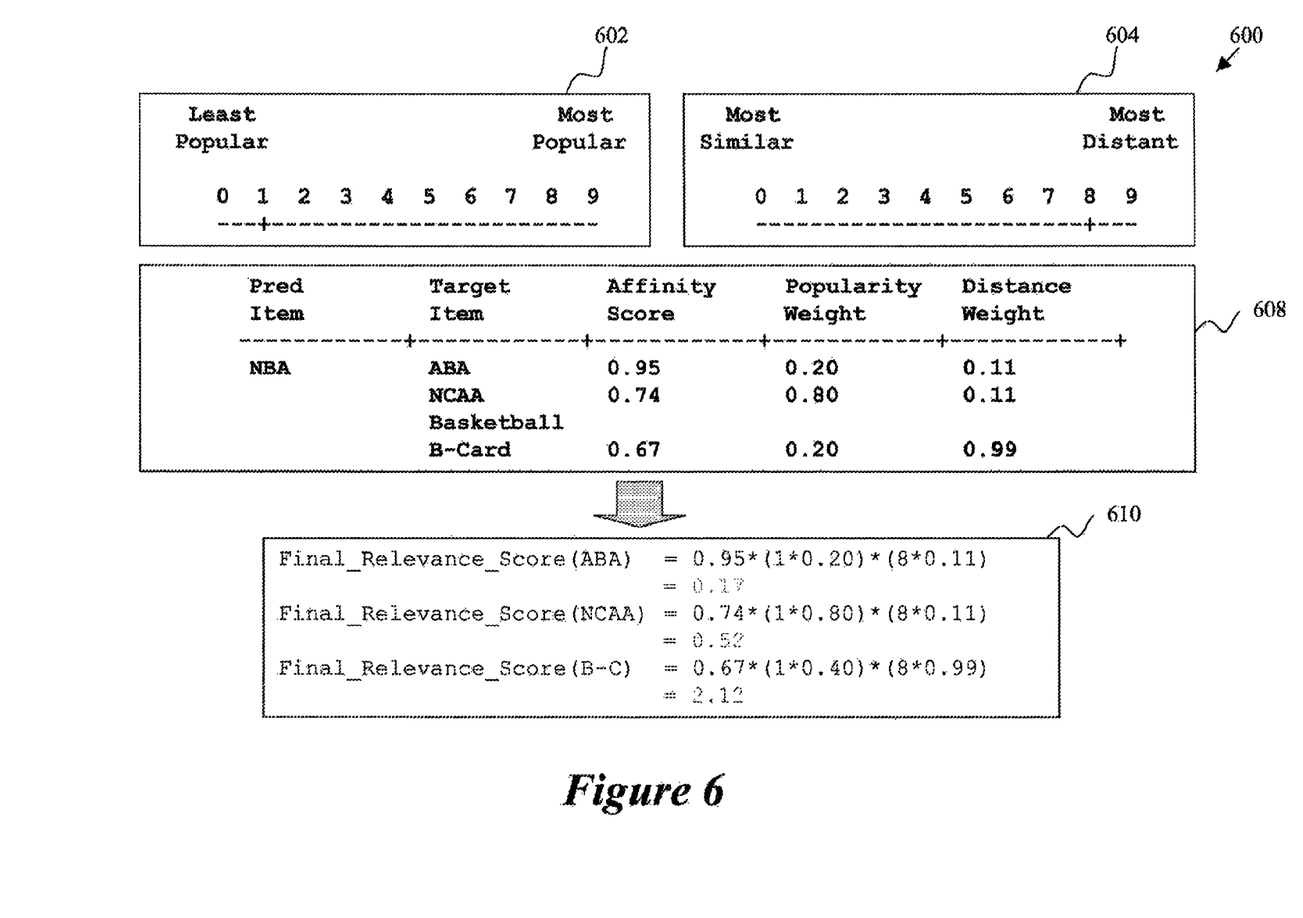
FIG. 6 illustrates user preference data combined with the parametric model of FIG. 5.

FIG. 6 illustrates the particular user specified preferences of popularity 602 and similarity 604, advantageously combined with the exemplary scores and parametric values illustrated in FIG. 5. Advantageously, the user adjusts these preferences by using the user interfaces described above in relation to FIGS. 1, 3 and 4. One of ordinary skill recognizes a variety of combinations for the user preferences of FIGS. 1, 3 and 4, and the parameterized data of FIG. 5. FIG. 6 illustrates a particular embodiment whereby, for each target item, the user popularity preference 602 is multiplied by the popularity weight, while the user similarity preference 604 is multiplied by the distance weight.

Then, once the parameter weights are adjusted by the user preferences, the weights are multiplied together, and the product is multiplied with the affinity score, to yield a final_relevance_score for each target item. Such relevance data 610 is advantageously stored and/or used to select, determine, and/or deliver content that is more relevant to the user. A variety of content items along with affinity data, and/or parametric weights, describing the relationship between content is preferably generated and/or used by a relevance engine 608 that operates by using or is represented by the parametric relevance model described above.

Hence, the parameterized relevance engine of these embodiments advantageously uses item data which is organized into sets, such as set of affinity items, and a corresponding set of affinity scores for each affinity item. Further, each affinity item has as set of corresponding item parameters. Each item parameter preferably has one score value for each parameter that is considered by the system and/or that is associated or known for the affinity item. The foregoing is generalized by the following item numbers and parameter numbers. The sample score and weight values are merely exemplary.

| Predictor Item | Affinity Item | Affinity Score | Param_1 Type | Param_1 Weight | Param_2 Type | Param_2 Weight |
|---|---|---|---|---|---|---|
| I_1 | I_237 | 0.58 | | 0.99 | | 0.12 |
| | I_98 | 0.74 | | 0.11 | | 0.99 |
| | I_56 | 0.95 | | 0.50 | | 0.48 |
| | ... | ... | | ... | | ... |

Accordingly, the system operates by using a number of affinity items and a number of parameters. Moreover, one of ordinary skill recognizes that these data are combined differently in different implementations. One implementation of the operation performed by the parameterized relevance engine is integration of all the parameter values available into one final score, which is generalized as follows:

$$\begin{aligned}\text{Final\_Score(affinity\_item)} =\\ \text{AFF\_Score} + \text{User\_Specified\_Pref\_for\_Param\_1} * \text{Param\_1 Weight} +\\ \text{User\_Specified\_Pref\_for\_Param\_2} * \text{Param\_2 Weight} \ldots +\\ \text{User\_Specified\_Pref\_for\_Param\_N} * \text{Param\_N Weight}\end{aligned}$$

III. User Parameter Profile Manager

Regardless of the particular calculations used to determine user desirability for content or relevance, at a given time, some embodiments include a User Parameter Profile Manager (UPPM) to store the user's customized parameter profile. The profile manager provides statistics on a user's behavioral patterns at an individual user level. The stored profile information has several beneficial uses such as, for example, users re-visit a previously determined or stored setting in similar contexts, without the need to re-enter preferences, and such data is shared across multiple user environments and/or experiences. Moreover, for targeting purposes, the profile manager uses stored user patterns as part of a user profile for prediction purposes, and further as a recommended and/or default parameter profile across users, such as for other similar users and/or for new users, who have little accumulated data.

Figure 7:
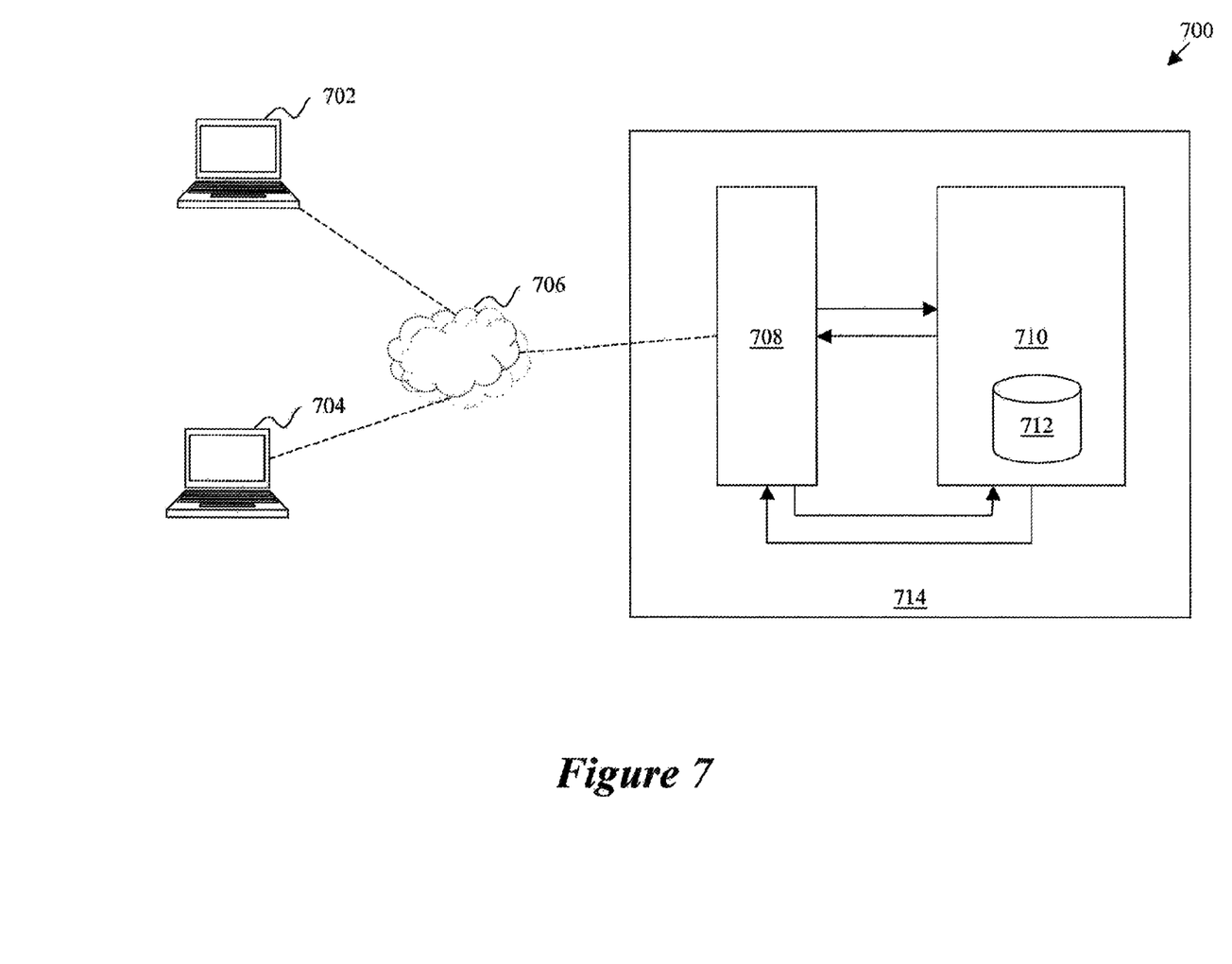
FIG. 7 illustrates a system implementation according to some embodiments.

FIG. 7 conceptually illustrates a user parameter profile manager 710 as part of a system 700 in accordance with some implementations. As shown in this figure, the system 700 includes one or more users who access content on the system 700 by using various electronic devices 702 and 704, such as computers, cellular telephones, personal digital assistants, and the like. These devices 702 and 704 are typically networked to a server environment 714 through a network 706, or network of networks such as the Internet. Content typically resides in a number of locations throughout the network 706, and is often difficult to find, view, organize, and/or navigate. Accordingly, server 714 includes a relevance engine 708, a profile manager 710, and one or more data storages 712. As illustrated in the figure, the relevance engine 708 is preferably coupled to the profile manager 710 and the data storage 712 by using multiple data paths.

The relevance engine 708 is advantageously used for performing calculations and relevance determinations based on user preference, affinity data, parametric weights, and/or a relevance scoring system. Hence, the relevance engine 708 is configured to exchange data with the profile manager 710 and data storage(s) 712 by using the data paths. For instance, in some embodiments a first user enters a first preference by using an interactive interface on the device 702. The user preference is received by the relevance engine 708, which uses the user preference to calculate relevance scores. Typically, the relevance engine 708 employs data retrieved from the profile manager 710, such as affinity data, parametric weights, and/or any stored profile data for the first user.

Once the relevance engine 708 calculates a set of relevance scores based on the available data, the scores are used in various ways. For instance, some embodiments rank content, select content, recommend and/or present the recommended content to the user. Further, the user preference and/or the calculated scores are stored by using the profile manager 710 such as in the data storage 720. The data is advantageously stored as part of a profile for the particular first user. Some embodiments track the users and profiles by using an identification system such that, as additional users interact with the system, preferences, scores, and/or profiles for these users are managed, stored, and/or retrieved by the system 700. Moreover, the various user identifiers, preferences, profiles, and other system data are passed by using the different data paths.

In some cases, little data has been accumulated for a second user such as a new user interacting with an interface through the device 704. In some of these cases, the server 714 provides an initial preference setting and/or profile, for the new user. The profile manager 710 and/or relevance engine 708 of some implementations advantageously provides the initial information for the new user based on demographic information, affinity data, other parameters, and/or stored profile information. For instance, some embodiments use profile information for similarly situated users.

Figure 8:
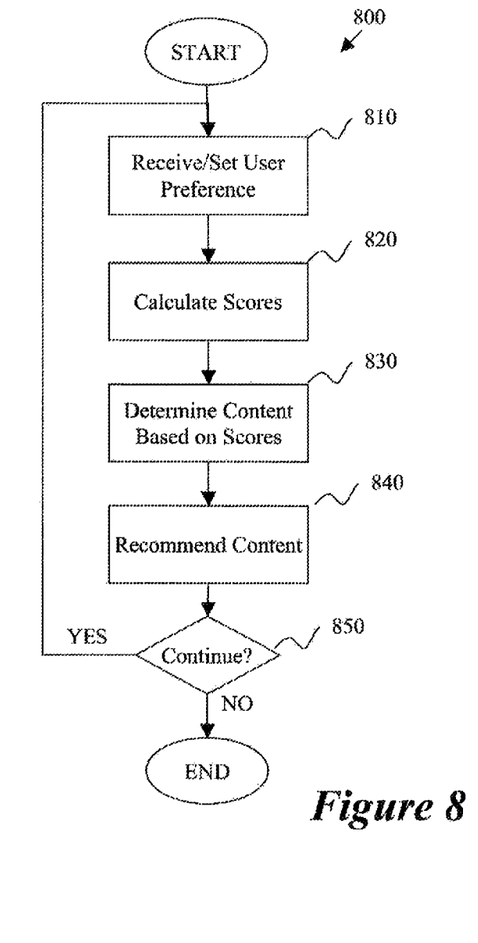
FIG. 8 is a process flow in accordance with some embodiments of the invention.

FIG. 8 is a process 800 that illustrates a method employed by some of the embodiments described above. As shown in this figure, the process 800 begins at the step 810, where a user preference is received and/or set. Typically, a user applies a preference by using the interactive user interface as described above. However, in some cases the preference is set by using information retrieved from another content area for a particular user, or from a set of demographically similar users, for a user who has little accumulated data, such as a new user, for example.

Once one or more preferences are set at the step 810, the process 800 transitions to the step 820, where a set of scores are calculated. Preferably, the scores are calculated by using a combination of the user preferences, and affinity and parametric weight data, for a variety of content. As described above, the content data is often complex and generated by using a variety of factors, including demographic information.

Advantageously, the result of the step 820 is a relevance scoring system that is customized for the particular user, for each of several items of content. The calculated information is optionally stored and/or retrieved for multiple applications such as, for example, to determine information about a specific user, or to perform determinations about a group of users.

Then, at the step 830, the process 800 determines and/or selects content having a desirable relationship to the user by using the set of scores calculated, stored, and/or retrieved at the step 820. After the desirable content is determined at the step 830, the process 800 transitions the step 840, where the selected content is presented and/or recommended to the user. One of ordinary skill recognizes a variety of means by which the selected content is presented to the user, such as, by "push" or other technologies, for example. Then, the process 800 transitions to the step 850, where a determination is made whether to continue and/or repeat the cycle. Some embodiments allow the user to input preferences at various times, such as in real time, for example. Moreover, some embodiments constantly update the preferences, affinities, weights, other parameters, and/or relevance scores periodically, on an ongoing basis, in real time, or based on particular stimuli, that often include the system activities of the user, and/or based on other system activities without the need for user interaction or activity. For instance, popularity data is often updated over a group of users, while similarity data is updated over a group of content items, without the need for specific interaction.

If the process 800 should continue at the step 850, then the process 800 returns to the step 810. Otherwise, the process 800 concludes.

As described above, some implementations store user customized parameter profiles and further, provide statistics on user behavioral patterns at an individual user level. One purpose of storing a user's customized parameter profile is for users to re-visit their settings in the future or over a variety of situations. Another purpose is that content providers advantageously use the stored patterns for prediction purposes, or as a recommended parameter profile for other similar users. Accordingly, the embodiments described above include a user-interactive, parameterized recommendation relevance machine that advantageously enables a user to participate in the recommendation process. These embodiments incorporate a user's contextual interest into the relevance parameters and affinity data, which enhances the user's experience and promotes beneficial interaction. Some embodiments accumulate and utilize user preference patterns for analysis. Additionally, some implementations present associated parameter values along with each individual recommendation, which also beneficially increases the user's experience of interactive participation and engagement with the recommendation system. The result is not only a more personalized experience, but also the potential for greater click-through and/or conversion rates.

While the invention has been described with reference to numerous specific details, one of ordinary skill in the art will recognize that the invention can be embodied in other specific forms without departing from the spirit of the invention. For instance, while the embodiments above are described in relation to online content, one of ordinary skill recognizes applications in additional media and data types. Thus, one of ordinary skill in the art would understand that the invention is not to be limited by the foregoing illustrative details, but rather is to be defined by the appended claims.

What is claimed is:

1. A computer-implemented method for determining relevance for a user between a predictor item of content and a plurality of target items of content, said method comprising:
    storing, in data storage, at least one weight parameter for said target items that measures similarity of content between a target item and said predictor item;
    storing an affinity score for each of said target items relative to said predictor item, that measures a correlation between said predictor item and said corresponding target item based on interests of a plurality of users;
    setting at least one user preference parameter that indicates similarity, including more similar and less similar, desired by said user for content relative to said predictor item;
    processing, in a computer, to determine relevance of said target items of content for said user by generating a final score by:
        multiplying said weight parameters on similarity for said target items with said user preference parameter for more similar or less similar to generate a user modified similarity score;
        adding said affinity score for each of said target items to said modified similarity score for each of said target items to generate said final score for each of said target items; and
    determining relevance of said target items of content for said user based on said final score for said target items.

2. The method as set forth in claim 1, further comprising:
    storing an affinity score for said target items of content that identifies a relationship for user affinity of content between a target item and a predictor item; and
    determining relevance of said target items of content for said user based on said affinity score.

3. The method as set forth in claim 2, further comprising updating one of said user preference, said weight parameter or said affinity score.

4. The method as set forth in claim 1, further comprising:
    storing, in data storage, a plurality of categories with said target items classified in said categories, so as to depict distance relationships among said target items of content; and
    determining similarity between said predictor item and said target items based on said distance relationships.

5. The method as set forth in claim 1, further comprising:
    displaying, on a user computer, an interactive user interface that permits a user to set said user preference.

6. The method as set forth in claim 1, wherein setting said user preference comprises:
    setting said user preference based on data obtained from a set of demographically similar users.

7. The method as set forth in claim 1, further comprising:
    selecting one of said target items of content to deliver to said user.

8. The method as set forth in claim 1, wherein:
    setting at least one user preference that indicates similarity comprises setting a range of interest for similarity to indicate user preference.

9. A system for determining relevance for a user between a predictor item of content and a plurality of target items of content, said system comprising:
    data storage for storing at least one weight parameter for said target items that measures similarity of content between a target item and said predictor item, and storing an affinity score for each of said target items relative to said predictor item, that measures a correlation between said predictor item and said corresponding target item based on interests of a plurality of users;
    at least one computer, coupled to said data storage, for setting at least one user preference parameter that indicates similarity, including more similar and less similar, desired by said user for content relative to said predictor item, for multiplying said weight parameters on similarity for said target items with said user preference parameter for more similar or less similar to generate a user modified similarity score, adding said affinity score for each of said target items to said modified similarity score for each of said target items to generate said final score for each of said target items, and for determining relevance of said target items of content for said user based on said final score for said target items.

10. The system as set forth in claim 9, wherein:
said data storage further for storing an affinity score for said target items of content that identifies a relationship for user affinity of content between a target item and a predictor item; and
said computer further for determining relevance of said target items of content for said user based on said affinity score.

11. The system as set forth in claim 10, wherein said computer further for updating one of said user preference, said weight parameter or said affinity score.

12. The system as set forth in claim 9, wherein:
said data storage further for storing, in data storage, a plurality of categories with said target items classified in said categories, so as to depict distance relationships among said target items of content; and
said computer further for determining similarity between said predictor item and said target items of based on said categories.

13. The system as set forth in claim 9, further comprising:
a user computer for displaying an interactive user interface that permits a user to set said user preference.

14. The system as set forth in claim 9, wherein:
said computer further for setting said user preference based on data obtained from a set of demographically similar users.

15. The system as set forth in claim 9, wherein:
said computer further for selecting one of said target items of content to deliver to said user.

16. The system as set forth in claim 9, wherein:
said computer further for setting a range of interest for similarity to indicate user preference.

17. A non-transitory computer readable medium storing a program for determining relevance for a user between a predictor item of content and a plurality of target items of content, comprising:
storing, in data storage, at least one weight parameter for said target items of content that measures similarity of content between a target item and said predictor item;
storing an affinity score for each of said target items relative to said predictor item, that measures a correlation between said predictor item and said corresponding target item based on interests of a plurality of users;
setting at least one user preference parameter that indicates similarity, including more similar and less similar, desired by said user for content relative to said predictor item;
processing, in a computer, to determine relevance of said target items of content for said user by generating a final score by:
multiplying said weight parameters on similarity for said target items with said user preference parameter for more similar or less similar to generate a user modified similarity score;
adding said affinity score for each of said target items to said modified similarity score for each of said target items to generate said final score for each of said target items; and
determining relevance of said target items of content for said user based on said final score for said target items.

18. The computer readable medium as set forth in claim 17, further comprising:
storing an affinity score for said target items of content that identifies a relationship between a target item and a predictor item; and
determining relevance of said target items of content for said user based on said affinity score.

19. The computer readable medium as set forth in claim 18, further comprising updating one of said user preference, said weight parameter or said affinity score.

20. The computer readable medium as set forth in claim 17, further comprising:
displaying, on a user computer, an interactive user interface that permits a user to set said user preference.

21. The computer readable medium as set forth in claim 17, wherein setting said user preference comprises:
setting said user preference based on data obtained from a set of demographically similar users.

22. The computer readable medium as set forth in claim 17, further comprising:
selecting one of said target items of content to deliver to said user.

23. The computer readable medium as set forth in claim 17, wherein:
setting at least one user preference that indicates popularity comprises setting a range of interest for popularity to indicate user preference.

24. The computer readable medium as set forth in claim 17, further comprising:
storing, in data storage, a plurality of categories with said target items classified in said categories, so as to depict distance relationships among said target items of content; and
determining similarity between said predictor item and said target items based on said distance relationships.

* * * * *